CARD FEED WITH MANUAL INTERVENTION PROVISIONS

Filed Aug. 2, 1968

INVENTOR
THOMAS DVORAK

United States Patent Office 3,524,640

Patented Aug. 18, 1970

3,524,640

CARD FEED WITH MANUAL INTERVENTION PROVISIONS

Thomas Dvorak, Norristown, Pa., assignor to Sperry Rand Corporation, New York, N.Y., a corporation of Delaware Filed Aug. 2, 1968, Ser. No. 749,753

Int. Cl. B65h *1/00*

U.S. Cl. 271—61 4 Claims

ABSTRACT OF THE DISCLOSURE

A manual intervention for a card handling device is provided which includes a card guide channel arranged relative to the main feeder mechanism of the handling device so as to permit a card to be operator inserted into the main card feed mechanism in preference to cards being fed from the main supply stack.

Figure 1:
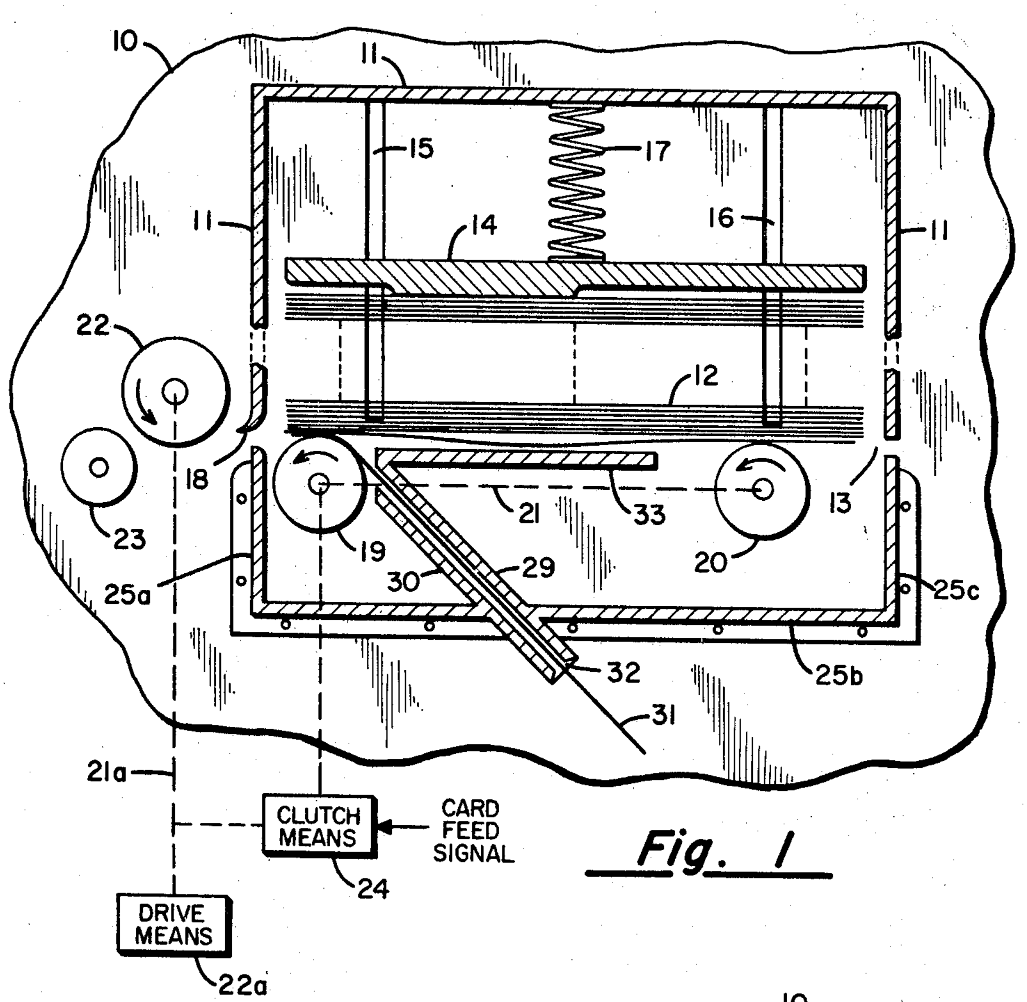

This invention relates to a punched card feeder mechanism or the like and, in more particular to a manual intervention device for card feeding mechanisms. This invention is an improvement over my application for "Friction Feed Device," Ser. No. 708,557, filed Feb. 27, 1968.

It frequently occurs in the use of card handling devices such as card punches, readers, verifiers, etc. that it is desirable for the operator to manually intervene in the feeding of cards. For example, in the operation of a card punching device, it may be desired from time to time for the operator to insert new detail, master, or program cards. Similarly, in verify operations on a verifier it frequently occurs that a blank card is to be inserted in the system. In the past to accommodate for such manual intervention, the card feed mechanism would be halted and a suitable substitute card inserted in the card deck by the operator. Such procedure is not always convenient since the operator must push the card deck back from the feed mechanism and insert the substitute card in the supply hopper. This requires that the operator handle the cards in the supply deck at the risk of mixing the cards in the deck; and unless the card hopper is carefully located frequently means that the operator must move from his normal operating position in order to make the substitution. It is accordingly a purpose of this invention to provide a convenient and simple device for permitting an operator to manually insert cards into the feeder mechanism of a card handling device.

BRIEF SUMMARY OF THE INVENTION

In accordance with the invention, a card feeder is provided which includes a card supply bin or hopper for holding a deck of cards. An intermittently driven friction roller device is located at the supply bin and is arranged to feed the cards sequentially one at a time from the bin into the card transport mechanism. A card guide channel is located externally of the bin and is angled so that a card manually inserted in the guide channel is forcibly interposed between the foremost card in the card deck and the feed roller whereby the manually inserted card will be the next card fed from the hopper into the transport system.

In the preferred embodiment of this invention, the card guide channel is shown in combination with the feeder mechanism comprising my above-identified application. It will be understood, however, that in its broader aspects, the present invention is equally applicable to other combinations of card feed mechanisms such as a belt feed of standard design.

Figure 2:
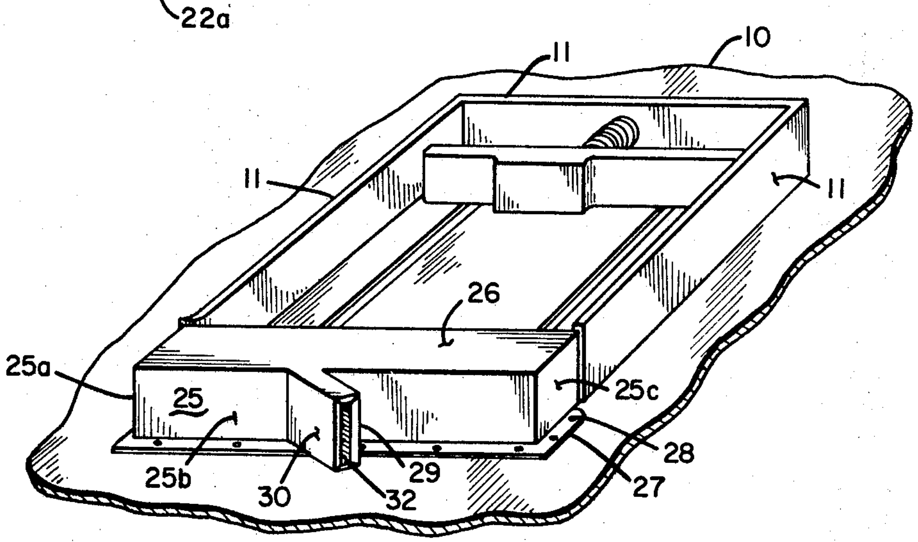

In the drawings:

FIG. 1 shows in section the organizational relationship of the various component parts comprising applicant's invention; and FIG. 2 is a simplified perspective view of the card feeder mechanism and the auxiliary card feed channel.

Referring now to FIGS. 1 and 2 of the drawings, 10 represents the base plate of the equipment (Punch, Reader, etc.) in which the present invention is used. In practice the base plate 10 may be positioned in the horizontal plane. Mounted on the base plate 10 are three upstanding wall members 11 which comprise the sides and the back of the card feed bin which contains the cards 12. The cards 12 are mounted in an upright position in the bin and are urged toward the open end 13 of the card bin by a pusher plate 14. The pusher plate 14 may be keyed (by means not shown) to a pair of longitudinal track members 15 and 16 or guide slots which are formed in the base plate 10 of the equipment. A spring 17 urges the pusher plate 14 and therefore the cards 12 toward the open end 13 of the bin.

The left-hand wall 11 of the card bin, as viewed in FIG. 1, contains a lip 18 which forms the throat of the card feeder mechanism through which the cards 12 pass upon being fed from the bin. Located at the open end 13 of the bin are a pair of friction rollers 19 and 20 which as described in my aforementioned application are intermittently driven so as to feed the cards 12 one at a time from the bin. In more particular, the feed rollers 19 and 20 may be mechanically coupled together as indicated by the dotted lines 21 and driven by a suitable drive means 22*a* upon energization of an electromagnetic clutch 24. Typically, and as set forth in my foregoing application, the coupling between rollers 19 and 20 may be made via a belt and pulley arrangement which is designed so as to drive roller 20 at a higher peripheral velocity than roller 19. By so driving the rollers 19 and 20 the foremost card in the stack 12 is caused to buckle as indicated in FIG. 1 which in turn separates the foremost card from the deck. As a card is being driven out of the supply bin through the throat 18, and before it reaches the main transport system it passes between a continuously driven counter-rotating friction roller 22 and an idler roller 23. The idler roller 23 causes the card to partially wrap around the friction roller 22 which functions to drive any subsequent card clinging to the foremost card back into the bin and prevents a double feeding action.

As diagrammatically illustrated by the dotted lines 21*a*, friction roller 22 is continuously driven by drive means 22*a*, whereas friction rollers 19 and 20 are driven upon demand by the application of a card feed signal to an electromagnetic clutch means 24. In operation, when a card is to feed from the supply bin, a card feed signal is applied to the clutch mechanism 24 to cause a momentary and predetermined rotation of the rollers 19 and 20 which in turn drives the foremost document out of the supply bin and into the transport path (which is not shown).

The description so far given corresponds to the apparatus shown in my above-identified application. The structure which comprises the addition provided by this invention includes a shell-like member 25 which is located at the open end 13 of the bin. The shell 25 which may be made of either plastic or metal may be shaped to have an external appearance which forms part of the industrial design of the equipment. If plastic is used for the shell 25, it may be molded, while if metal is utilized it may be cast. In any event the shell 25 comprises a top cover plate 26, a front wall 25*b* and two side walls 25*a* and 25*c*. The shell is open at its back wall to permit communication with the card bin and is open at its bottom so as to permit it be removably fitted over the rollers 19 and 20 of the feed mechanism. A flange member 27 with suitable screw or fastening holes 28 located therein may extend around the outer periphery of the three walls of the shell to permit fastening the shell 25 to the base plate 10 of the card handling equipment.

Included in the shell 25, and preferably integrally formed therewith are a pair if parallel plates or partitions 29 and 30 which depend downwardly from the top cover plate 26 to the base plate 10. The plates 29 and 30 are spaced from one another by a suitable distance to form the guide channel into which a card such as shown at 31 in FIG. 1 may be inserted. The plates 29 and 30 are angled toward the front feed roller 19 so that upon insertion of the card 31 it is guided by plates 29 and 30 into the area between the feed roller 19 and the foremost card 12 in the bin as shown in FIG. 1. Also as shown in the figures, the plates or partitions 29 and 30 may extend outwardly beyond the exterior of the front wall **25*b* of the shell 25 so as to form an entrance point 32 for the receipt of a card. The shell may also further include a plate-like member 33 (FIG. 1) which depends downwardly from the cover plate 26 of the shell 25 to the base plate 10 to thereby form the bow limit plate described in my above-identified application. Plate 33 is provided to limit the bowing action of the foremost document in the deck 12 and to prevent this document from being pushed out of the bin by the pusher plate 14**.

In operation, when it is desired that the operator intervene in the card feeding action, the card feed signals which are generated by the equipment with which the card feed is normally used are inhibited and a substitute card 31 is manually inserted into the guide channel through the entrance 32. The operator manually forces the card into an engaging condition with roller 19 as shown by FIG. 1. The card feed signals are then reapplied to the clutch means 24 and the card held in the guide channel is next fed from the card feed mechanism into the transport path. For operator convenience, the guide channel and its location relative to the supply bin is situated to face the operator and be at arms length from his normal position when he is attending the machine. The invention thus provides a simple, inexpensive convenient and attractive means for permitting the operator to intervene in the card feeding operation.

What is claimed is:

1. In a document feeder which comprises a document hopper having an open end from which documents contained within the hopper may be fed, a drive feed device for gripping and feeding documents from the hopper, and means for urging the documents into engagement with the feed device; the improvemet which comprises, a document guide channel disposed externally to said hopper and angled toward said feed device, said guide channel being arranged so that a document manually fed into said guide channel may be forcibly inserted between the foremost document contained in said hopper and said feed device whereby upon actuation of said feed device the manually inserted document is fed from the feeder in precedence over the document in said hopper.

2. A structure as set forth in claim 1 wherein said feed device is a friction roller.

3. A structure as set forth in claim 1 wherein the guide channel comprises a pair of spaced parallel plate members.

4. A structure as set forth in claim 1 wherein the open end of said hopper is terminated in a shell member and wherein said guide channel comprises a pair of spaced parallel plate members integrally formed in said shell member.

References Cited

UNITED STATES PATENTS

| | | | |
|---|---|---|---|
| 2,806,696 | 9/1957 | Bishop | 271—61 X |
| 3,265,386 | 8/1966 | Palamenti | 271—61 |

EVON C. BLUNK, Primary Examiner

D. D. WATTS, Assistant Examiner